United States Patent [19]

Lhymn et al.

[11] Patent Number: 4,962,003

[45] Date of Patent: Oct. 9, 1990

[54] DEVELOPMENT OF FUSIBLE ALLOY COMPOSITES

[76] Inventors: Yoon O. Lhymn; Chang Lhymn, both of 2908 Bement St., Erie, Pa. 16506

[21] Appl. No.: 187,734

[22] Filed: Apr. 29, 1988

Related U.S. Application Data

[63] Continuation-in-part of Ser. No. 166,060, Mar. 7, 1988, abandoned.

[51] Int. Cl.$^5$ .................. C22C 1/09; C22C 13/00; C22C 13/02
[52] U.S. Cl. .................. 428/614; 420/559; 420/562
[58] Field of Search .......... 428/600, 614; 164/97; 420/559, 558, 557, 562, 571

[56] References Cited

U.S. PATENT DOCUMENTS

| | | | |
|---|---|---|---|
| 1,628,759 | 5/1927 | Worrall | 428/614 |
| 2,281,029 | 4/1942 | Earle | 420/577 |
| 3,166,808 | 1/1965 | Moore | 22/200 |
| 3,605,902 | 9/1971 | Ault | 428/608 |
| 3,622,283 | 11/1971 | Sara | 428/614 |
| 3,638,734 | 2/1972 | Ault | 428/608 |
| 3,864,807 | 2/1975 | Schneider et al. | 428/614 |
| 4,341,823 | 7/1987 | Sexton et al. | 428/614 |

FOREIGN PATENT DOCUMENTS

| | | | |
|---|---|---|---|
| 2302346 | 9/1976 | France | 420/559 |
| 46-16815 | 5/1971 | Japan | 420/577 |
| 53-123327 | 10/1978 | Japan | 420/577 |
| 56-123845 | 9/1981 | Japan . | |
| 57-89940 | 6/1982 | Japan . | |
| 59-4940 | 1/1984 | Japan | 164/97 |
| 59-136215 | 8/1984 | Japan . | |
| 60-94323 | 5/1985 | Japan . | |
| 310764 | 8/1971 | U.S.S.R. | 420/557 |
| 2165860A | 4/1986 | United Kingdom . | |

OTHER PUBLICATIONS

O. J. Seeds, "How to Select and Use Low-Melting Alloys as Production Aids", Materials & Methods, Sept., 1950, pp. 64-68.
W. C. Smith, "Low Melting Alloys as Production Aids", Metals and Alloys, Aug., 1945, pp. 397-402.
Engineering Index Monthly, Sept., 1987, Abstract 091362.
Metals Abstracts, Nov., 1986, vol. 19, Abstract 51-1773, "Casting Low-Melting Point Alloy".
Automotive Engineer, vol. 12, No. 1, Feb./Mar. (1987), p. 38.

*Primary Examiner*—John J. Zimmerman
*Attorney, Agent, or Firm*—Ralph Hammar

[57] ABSTRACT

In summary of this disclosure, the present invention provides novel metal matrix fibrous composites which can be used as a fusible core in molding plastics. Modifications are possible within the scope of this invention.

6 Claims, 4 Drawing Sheets

DEVELOPMENT OF FUSIBLE ALLOY COMPOSITES

REFERENCE TO RELATED APPLICATIONS

This application is a continuation-in-part of U.S. patent application Ser. No. 166,060 filed Mar. 7, 1988 now abandoned.

FIELD OF INVENTION

The present invention relates to novel fusible core alloy compositions for use with the lost core technology, which is useful in manufacturing hollow plastic parts.

BACKGROUND TO THE INVENTION

Fusible alloys for use with the lost core technology have been known for several years. A recent article published in *Automotive Engineer* (vol.12, no.1, Feb/-Mar (1987) page 38) mentions hollow engine components in plastics and the British Patent No. GB 2165860 A (UK) issued on Oct. 21, 1985 describes the casting of low-melting point alloy for use with the lost core technology. Plastic engine parts in fusible-metal-core-technique on the example of an intake manifold are also mentioned in *Automobiltech Z.*, v.89, n.3, Mar (1987) page 139.

Generally, fusible cores for lost core plastic molding must be strong during molding and melt out easily during decoring.

BRIEF DESCRIPTION OF THE DRAWINGS

The present invention is described in detail below with reference to the accompanying drawings, in which.

SUMMARY OF INVENTION

It has now been surprisingly found that composite materials based on the tin-bismuth alloy can meet the dual requirements of high strength and low melting point. Specifically binary tin-bismuth alloys contain short copper-coated steel fibers as a reinforcing agent and they can be melt out in a hot oil bath. A complete mixing of copper-coated steel fibers with the tin-bismuth alloy can be effectively achieved by stirring the melt.

The composition provided in accordance with the present invention comprises:
(a) about 1 to 12 wt. % of bismuth metal,
(b) about 99 to about 88 wt. % of tin metal,
(c) about 35 wt. % or less short copper-coated steel fibers,
(d) copper-coated steel fibers with their length less than about three inches,
(e) copper-coated steel fibers with their diameter less than about half inch, and
(f) copper-coated steel fibers with the copper content greater than about one wt. %.

Figure 1:
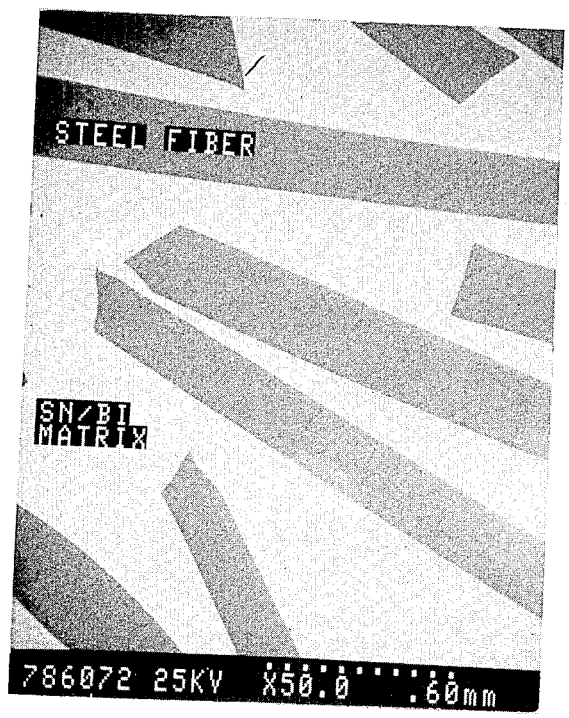
FIG. 1 shows a photomicrograph revealing the distribution of short steel fibers in the 93 wt. % tin/7 wt. % bismuth alloy matrix phase.
Figure 2:
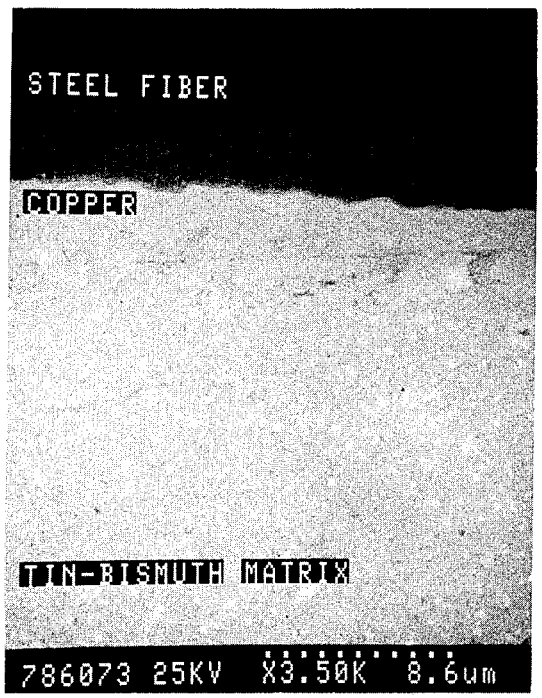
FIG. 2 shows a photomicrograph revealing the copper coating layer on a steel fiber in the tin-bismuth matrix of FIG. 1.

In a preferred aspect of the invention, copper clad steel wires are cut to a short length, pretreated chemically, and electroless copper plated. The fabrication of alloy composites is performed by heating the mixture of tin, bismuth, and copper coated steel fibers to a temperature greater than about 300 degree C. and less than the melting point of copper in a protective atmosphere such as nitrogen or argon gas. In this melt-mixing process, the melt is given a stirring agitation to improve the wetting of copper/steel fiber by the tin-bismuth alloy matrix. The duration of the melt-mixing process must be long enough to ensure complete wetting of fibers. The core melt-out is done in a hot oil bath, preferably in conjunction with the induction coil heating. A micrograph of fiber distribution in a tin-bismuth alloy matrix is shown in FIG. 1 and a detailed microstructure of steel fiber/copper coating film/tin-bismuth matrix section is shown in FIG. 2. The present invention, therefore, provides an appropriate combination of tin, bismuth, and copper-coated steel fibers to produce core alloy composites suitable for molding thermoset products at about 170 degree C. and for fusing the core out at about 200 degree C.

The preceding invention on tin-bismuth-copper/steel fiber composites describes the fabrication process of "type 1" alloy composites. The following description will relate to the development of "type 2" alloy composites which consist of tin, lead, antimony, and copper-coated steel fibers. The high temperature strengths at 170 degree C. of type 1 composites are higher than type 2 composites, although the melting temperatures of both type 1 and type 2 composites are adjusted to be approximately 200 degree C.

The composition of type 2 alloy composites in accordance with the present invention comprises:
(a) about 3 to about 15 wt. % of lead metal,
(b) about 1 to about 12 wt. % of antimony metal,
(c) about 80 to about 96 wt. % of tin metal,
(d) copper-coated short steel fibers less than about three inches in length,
(e) copper-coated steel fibers less than about half inch in diameter,
(f) less than about 35 wt. % copper-coated steel fiber, and
(g) copper-coated steel fibers with the copper content greater than about one wt. percent.

Figure 3:
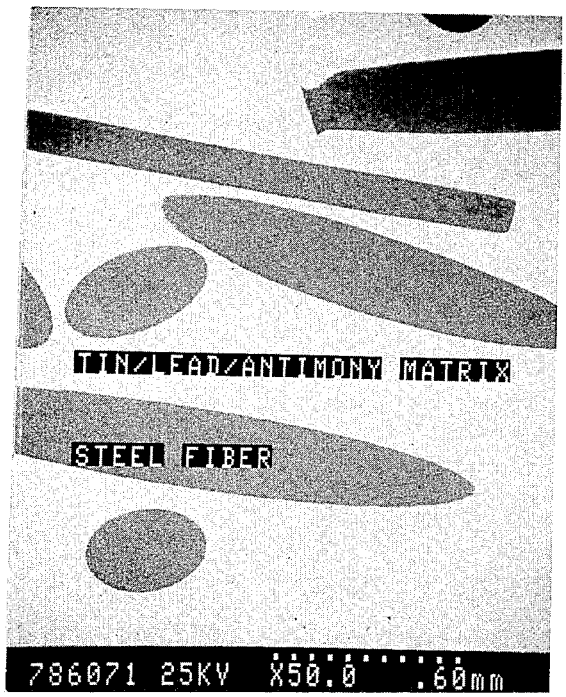
FIG. 3 shows a photomicrograph revealing the distribution of copper-coated steel fibers in the 90 wt. % tin/7 wt. % lead/3 wt. % antimony alloy matrix phase.

A typical micrograph of fiber distribution in a tin-lead-antimony alloy matrix is shown in FIG. 3.

Figure 4:
FIG. 4 shows a photomicrograph revealing the copper coating layer on a steel fiber in the eutectic 43 wt. % tin/57 wt. % bismuth alloy matrix.

The concept of composites can also be applied to the eutectic tin/bismuth alloy to strengthen the alloy matrix by adding short copper-coated steel fibers, which melts at about 137 degree C. A typical micrograph of copper coating layer on a steel fiber in such eutectic tin-bismuth matrix is shown in FIG. 4.

DETAILED DESCRIPTION OF PREFERRED EMBODIMENTS

In order to increase the melting temperature of the tin-bismuth system to about 200 degree C., a composition very close to pure tin was chosen and copper-coated steel fibers were added to strengthen the matrix. A similar reasoning applies to the tin-lead-antimony system reinforced with copper-coated steel fibers, the melting temperature of which is approximately 200 degree C.

EXAMPLES

Examples 1 to 3

A number of short copper-coated steel fiber reinforced tin-based matrix composite materials were prepared by melting the mixture of alloy and fiber at about 300 to about 700 degree C. in a nitrogen atmosphere. The first example describes the formulation of tin-bismuth alloy matrix reinforced with short copper-coated steel fibers and the second example describes the fabrication of tin-lead-antimony alloy matrix reinforced with short copper-coated steel fibers. The third example relates to the formulation of eutectic tin-bismuth alloy matrix reinforced with short copper-coated steel fibers, the melting temperature of which is about 137±3 degree C.

Example 1

Commercially available copper-clad steel fibers were cut to 2 to 3 mm in length, rinsed in acetone, etched for a few seconds in 10% hydrochloric acid solution, and then electroless copper plated. The copper plating solution consists of 1 gr of copper sulfate, 1 gr of sodium hydroxide, 1 gr of disodium EDTA, and 1 ml of formaldehyde solution in 100 cc of deionized water. The chemical plating was performed at about 110 to 120 degree F. under stirring. The electroless copper plated short steel fibers were then rinsed in d.i. water and dried prior to mixing with tin and bismuth. Stoichiometric amount of 65 wt. % tin, 5 wt. % bismuth, and 30 wt. % steel fiber was heated to about 400 to about 600 degree C. in a flowing nitrogen atmosphere. Generally the tensile strength of such copper/steel fiber reinforced tin-bismuth composite is about 1.5 to 2 times as strong as unreinforced tin-bismuth alloy at 170 degree C. The fabricated alloy composite material melts at about 200 degree C. in a hot oil.

Example 2

Stoichiometric mixture of 65 wt. % tin, 6 wt. % lead, 2 wt. % antimony, and 27 wt. % copper-coated steel fibers was heated to about 700 degree C. in a flowing nitrogen atmosphere and the mixing process was aided by stirring. The length of short steel fibers was about 2 to 3 mm and fibers were electroless copper plated prior to melt-mixing. The melting temperature of fabricated fibrous composite is about 200 degree C. and can be melt out in a hot oil. Generally, the tensile strength of tin-lead-antimony matrix/steel fiber composite is about 1.3 to about 1.5 times as strong as unreinforced tin-lead-antimony alloy matrix at 170 degree C.

Example 3

Stoichiometric mixture of 4 parts by weight of 43 wt. % tin-57 wt. % bismuth eutectic alloy and 1 part by weight of copper-coated short steel fiber was heated to about 400 degree C. in a nitrogen atmosphere under stirring. Short steel fibers were electroless copper plated as in examples 1 and 2. The melting temperature of this eutectic tin-bismuth alloy composite is about 137 degree C. and can be melt out in a hot oil. In general, the tensile strength of tin-bismuth matrix/steel fiber composite is approximately 1.5 times as strong as unreinforced tin-bismuth eutectic alloy at room temperature.

The composites are not limited to short lengths of copper-coated steel wire. Other particles such as silver-coated copper-clad steel, copper-coated stainless steel dispersion-hardened copper, copper-coated molybdenum, copper-coated niobium, copper-coated tungsten, copper-coated titanium, copper-coated niobium, copper-coated ceramic, copper-coated aluminum oxide, copper-coated inconel (trademark), copper-coated nickel-clad carbon, copper-coated silica, copper-coated titanium dioxide.

The core alloys of example 1 may range from 1 to 12 wt. % bismuth and 86 to 99 wt. % tin. The core alloys of example 2 may range from 3 to 15 wt. % lead, 1 to 12 wt. % antimony, and 80 to 96 wt. % tin. The core alloys of example 3 may range from 56 to 59 wt. % bismuth and 41 to 44 wt. % tin.

What is claimed is:

1. A core for lost core plastic molding of hollow plastic parts, said core having strength sufficient to preclude deformation of the core during plastic molding and having a melting point low enough to permit melt out of the core without degrading the molded part, said core having good melt-flow behavior, said core consisting essentially of a major amount of an alloy of tin and one or more metals selected from the group consisting of lead, antimony, and bismuth and a minor amount of discreet short copper-coated iron or steel fibers dispersed in and bonded to said alloy, said fibers being flowable with the melted alloy during melt out of the core.

2. The core of claim 1, wherein the material of said alloy consists of about 88 to about 99 wt. % tin and about 1 to 12 wt. % bismuth, which melts at about 200 degree C.

3. The core of claim 1, wherein the material for said alloy consists of about 3 to about 15 wt. % of lead, about 1 to about 12 wt. % of antimony, and about 80 to about 96 wt. % of tin, which melts at approximately 200 degree C.

4. The core of claim 1, wherein the material for said alloy consists of about 56 to about 59 wt. % bismuth and about 41 to about 44 wt. % tin, which melts at about 137±4 degree C.

5. The core for lost core plastic molding comprising a tin-based alloy matrix reinforced with discreet short strong copper-coated fibers compatible with the tin-based matrix alloy.

6. A core alloy for cores for lost core plastic molding comprising a major amount of the alloy with one or more metals from the group consisting essentially of tin, lead, antimony, bismuth, plus
   a minor amount of copper-coated discreet short iron or steel fibers dispersed in and bonded to said alloy, said fibers being bonded to the alloy and flowable with the molten alloy during melt out of the core.

* * * * *